United States Patent [19]
Dieterich

[11] Patent Number: 5,055,916
[45] Date of Patent: Oct. 8, 1991

[54] CHROMINANCE ENCODING FOR A WIDESCREEN TELEVISION SYSTEM

[75] Inventor: Charles B. Dieterich, Kingston, N.J.

[73] Assignee: General Electric Company, Princeton, N.J.

[21] Appl. No.: 448,435

[22] Filed: Dec. 11, 1989

[51] Int. Cl.⁵ .................. H04N 11/00; H04N 11/14
[52] U.S. Cl. ........................................... 358/12
[58] Field of Search ................................. 358/12

[56] References Cited

U.S. PATENT DOCUMENTS

| | | | |
|---|---|---|---|
| 2,986,597 | 5/1961 | Teer | 358/15 |
| 4,084,181 | 4/1978 | Mita et al. | 358/12 |
| 4,268,854 | 5/1981 | Ozawa | 358/27 |
| 4,318,126 | 3/1982 | Sassler | 358/141 |
| 4,782,383 | 11/1988 | Isnardi | 358/12 |
| 4,855,811 | 8/1989 | Isnardi | 358/12 |
| 4,944,032 | 7/1990 | Kageyama et al. | 358/12 |

FOREIGN PATENT DOCUMENTS 120386  7/1983  Japan ...................... 358/14

OTHER PUBLICATIONS

M. A. Isnardi et al., "Encoding for Compatibility and Recoverability in the ACTV System", IEEE Transactions on Broadcasting, vol. BC-33, No. 4, Dec. 1987.

M. A. Isnardi et al., "Decoding Issues in the ACTV System", IEEE Transactions on Consumer Electronics, vol. 34, No. 1, Feb. 1988.

Primary Examiner—John W. Shepperd
Attorney, Agent, or Firm—Joseph S. Tripoli; Eric P. Herrmann; Ronald H. Kurdyla

[57] ABSTRACT

A widescreen television system includes an auxiliary subcarrier modulated with left and right side panel luminance and chrominance components. The chrominance modulating component represents the difference between the average side panel chrominance information and the original side panel chrominance information. Average left and right side panel chrominance information is respectively conveyed during the horizontal blanking intervals of alternate lines.

29 Claims, 10 Drawing Sheets

SINGLE CHANNEL NTSC COMPATIBLE WIDESCREEN EDTV SYSTEM

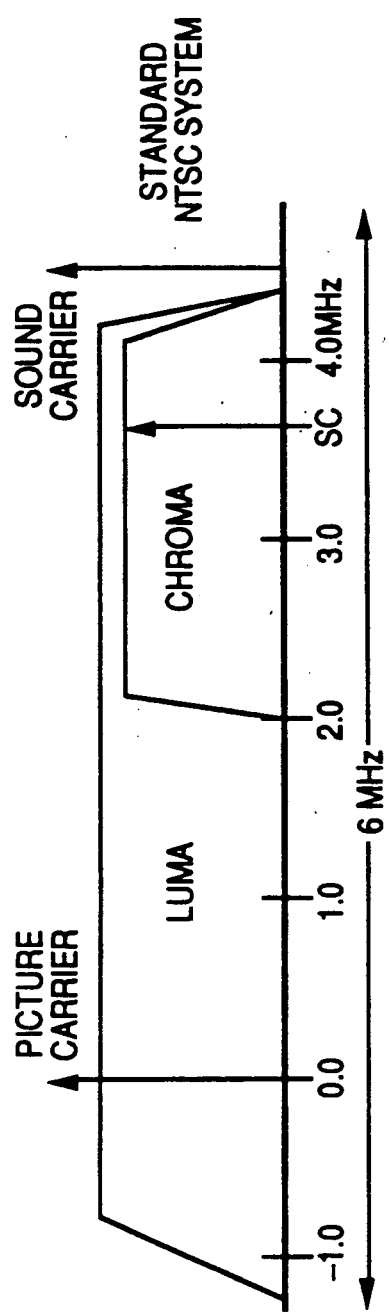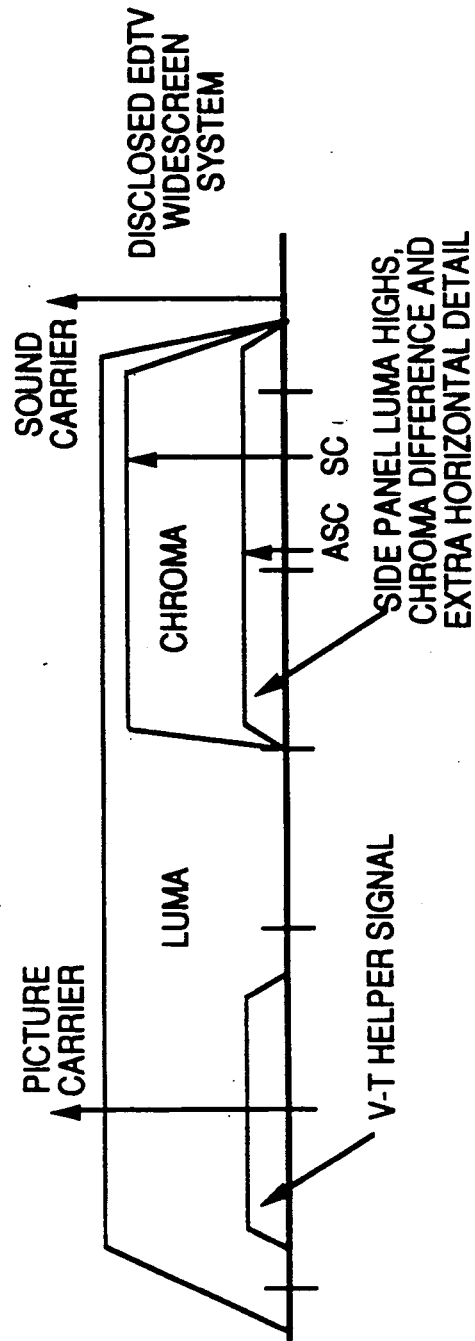

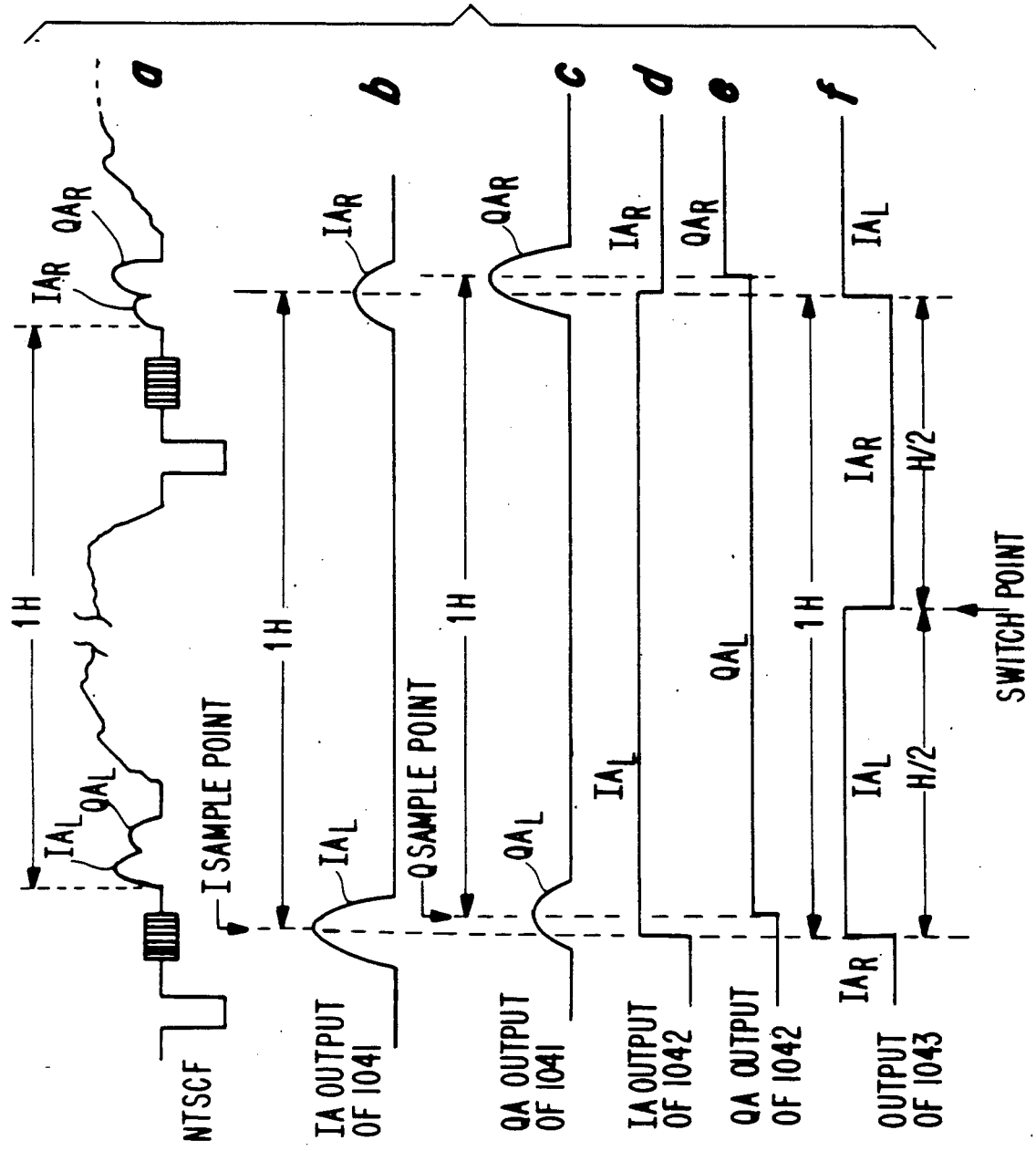

CHROMINANCE ENCODING FOR A WIDESCREEN TELEVISION SYSTEM

BACKGROUND OF THE INVENTION

This invention concerns apparatus for encoding auxiliary image information in a widescreen television system of the type including an auxiliary subcarrier for conveying auxiliary information.

A conventional television receiver, such as a receiver in accordance with NTSC broadcast standards adopted in the United States and elsewhere, has a 4:3 aspect ratio (the ratio of the width to the height of a displayed image). Recently, there has been interest in using higher aspect ratios for television receiver systems, such as 2:1, 16:9 or 5:3, since such higher aspect ratios more nearly approximate or equal the aspect ratio of the human eye than does the 4:3 aspect ratio of a conventional television receiver.

It is desirable for widescreen television systems to be compatible with conventional television receivers to facilitate the widespread adoption of widescreen systems. It is also desirable to have such a compatible widescreen system with provisions for enhancing or extending the definition of a displayed image so as to provide extra image detail. Such a widescreen EDTV (extended definition television) system is described by M. A. Isnardi et al. in an article "Encoding for Compatibility and Recoverability in the ACTV System", published in *IEEE Transactions on Broadcasting*, Vol. BC-33, December 1987, and in U.S. Pat. No. 4,855,811 of M. A. Isnardi.

In the Isnardi et al. system, an auxiliary subcarrier is quadrature modulated with first and second auxiliary signals. One of the modulating auxiliary signals contains extra horizontal high frequency luminance information for enhancing image detail. The other modulating auxiliary signal contains time expanded left and right side panel components including high frequency chrominance and luminance information. Low frequency side panel chrominance and luminance information is time compressed into an overscan region of a main signal component containing center panel information.

SUMMARY OF THE INVENTION

In accordance with the principles of the present invention, it is herein recognized as desirable to reduce image artifacts associated with chrominance information conveyed by the auxiliary subcarrier. To this end, in a disclosed preferred embodiment of the invention, side panel chrominance information is divided into a difference signal component and an average signal component. Chrominance information representative of the difference between average side panel chrominance information and original side panel chrominance information modulates an auxiliary subcarrier. Average left and right side panel chrominance information is conveyed by other means, such as within horizontal blanking intervals of alternate image lines. Specifically, average left panel color difference components I and Q are sent in the form of paired pulses during the horizontal blanking interval of even lines, and average right panel color difference components I and Q are sent in the form of paired pulses during the horizontal blanking interval of odd lines. The average signal component is in the form of a single number estimate of average side panel chrominance information to avoid unwanted band edge effects, such as ringing, associated with filtering.

DESCRIPTION OF THE DRAWING

FIGS. 2A, 2B, 3-5 and 8, 9, 11 depict signal waveforms and diagrams helpful in understanding the operation of the disclosed system;

In the system of FIG. 1, elements which are common to the more detailed system of FIG. 1a are identified by the same reference number. As shown in FIG. 1, an original widescreen progressive-scan signal with left, right and center panel information is processed to develop four separate encoding components as disclosed in aforementioned U.S. Pat. No. 4,855,811. These four components are illustrated generally in FIG. 1 in the context of an image display. The first component contains time expanded center panel information and time compressed low frequency side panel luminance information exclusive of chrominance information, and has a luminance bandwidth which does not exceed the NTSC luminance bandwidth of 4.2 MHz in this example. This signal is encoded in standard NTSC format.

Figure 1:
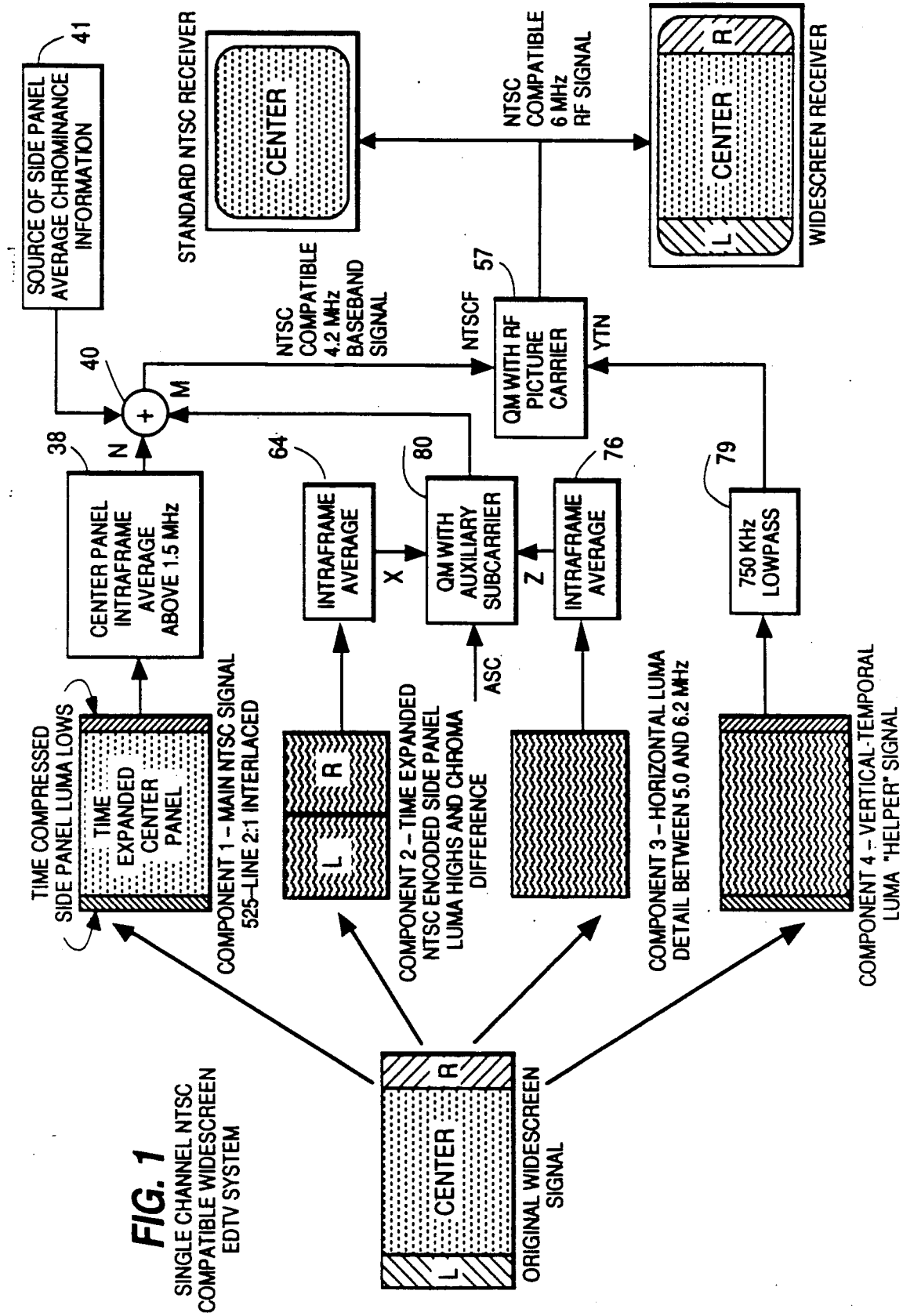
FIG. 1 illustrates a general overview of a compatible widescreen EDTV encoder system in accordance with the present invention.

The second component contains high frequency side panel luminance information, and side panel chrominance information representative of the difference between average side panel chrominance information and the original side panel chrominance information. The time expansion of the second component reduces its horizontal bandwidth to about 1.1 MHz. The second component is time compressed so that it exhibits the width of the center panel portion of component 1. This component is spatially uncorrelated with the main signal (the first component), and special precautions are taken to mask its visibility on standard NTSC receivers, as will be discussed.

The 5.0 to 6.2 MHz extended high-frequency luminance information content of the third component is first shifted downward in frequency to a frequency range of 0 to 1.2 MHz before further processing. This component is mapped into the standard 4:3 format, which spatially correlates it with the center panel portion of the main signal (the first component) to mask its visibility on standard NTSC receivers.

The fourth component, a vertical-temporal "helper" signal, is mapped into standard 4:3 format to correlate it with the main signal component to thereby mask its visibility on standard NTSC receivers, and is horizontally bandwidth limited to 750 KHz.

The first, second, and third components are processed by respective intraframe averagers 38, 64, and 76 to eliminate V-T crosstalk between the main and auxiliary signal components at a widescreen receiver. The first component is intraframe averaged only in the center panel portion, and only above approximately 1.5 MHz. The second and third intraframe averaged components, identified as X and Z, are non-linearly amplitude compressed prior to quadrature modulating a 3.108 MHz auxiliary subcarrier ASC, having a field alternating phase unlike that of a chrominance subcarrier, in a block 80. A modulated signal (M) from block 80 is added to the intraframe averaged first component (N) in an adder 40. Adder 40 also receives a signal representative of average side panel chrominance information from a source 41, as will be discussed in connection with other FIGURES. An output signal from adder 40 is a 4.2 MHz bandwidth baseband signal NTSCF that, together with a 750 KHz low pass filtered fourth component YTN from a filter 79, quadrature modulates an RF picture carrier in a block 57 to produce an NTSC compatible RF signal which can be transmitted to a standard NTSC receiver or a widescreen progressive scan receiver via a single, standard bandwidth, broadcast channel.

The use of time compression on the first component allows low frequency side panel luminance information to be squeezed entirely into the horizontal overscan region of a standard NTSC signal. The high frequency side panel luminance information and the side panel chrominance difference information are spectrally shared with the standard NTSC signal through the video transmission channel, in a manner transparent to a standard receiver, through the use of an auxiliary subcarrier quadrature modulation technique involving block 80 as will be discussed. When received by a standard NTSC receiver, only the center panel portion of the main signal (the first component) is seen.

FIG. 2 illustrates the RF spectrum of the disclosed EDTV widescreen system, including the auxiliary information, compared to the RF spectrum of a standard NTSC system. In the spectrum of the disclosed system the side panel modulation information (the luminance highs and chrominance difference information) and the extra high frequency horizontal luminance detail modulation information extend approximately 1.1 MHz on either side of the 3.108 MHz auxiliary subcarrier (ASC) frequency. The V-T helper signal information (component 4) extends 750 KHz on either side of the main signal picture carrier frequency.

Recovery of components 1, 2, and 3 at a widescreen progressive scan receiver is accomplished by utilizing a process of intraframe averaging at the transmitter and receiver. This process is associated with elements 38, 64, and 76 in the transmitter system of FIGS. 1 and 1a, and with associated elements at the receiver as will be discussed. As disclosed in U.S. Pat. No. 4,855,811, for intraframe averaging is a signal conditioning technique which prepares two spatially correlated signals for mutual combining so that they can be recovered efficiently and accurately afterwards, such as by means of a field storage device. A group of pixels one field (262H) apart is made to contain pixels of identical value such as by replacing original pixel values with their average value. Components 1 is interframe processed above a given frequency such as 1.5 MHz so as not to affect lower frequency vertical detail information, while components 2 and 3 are intraframe processed across their entire bandwidth.

Figure 1A:
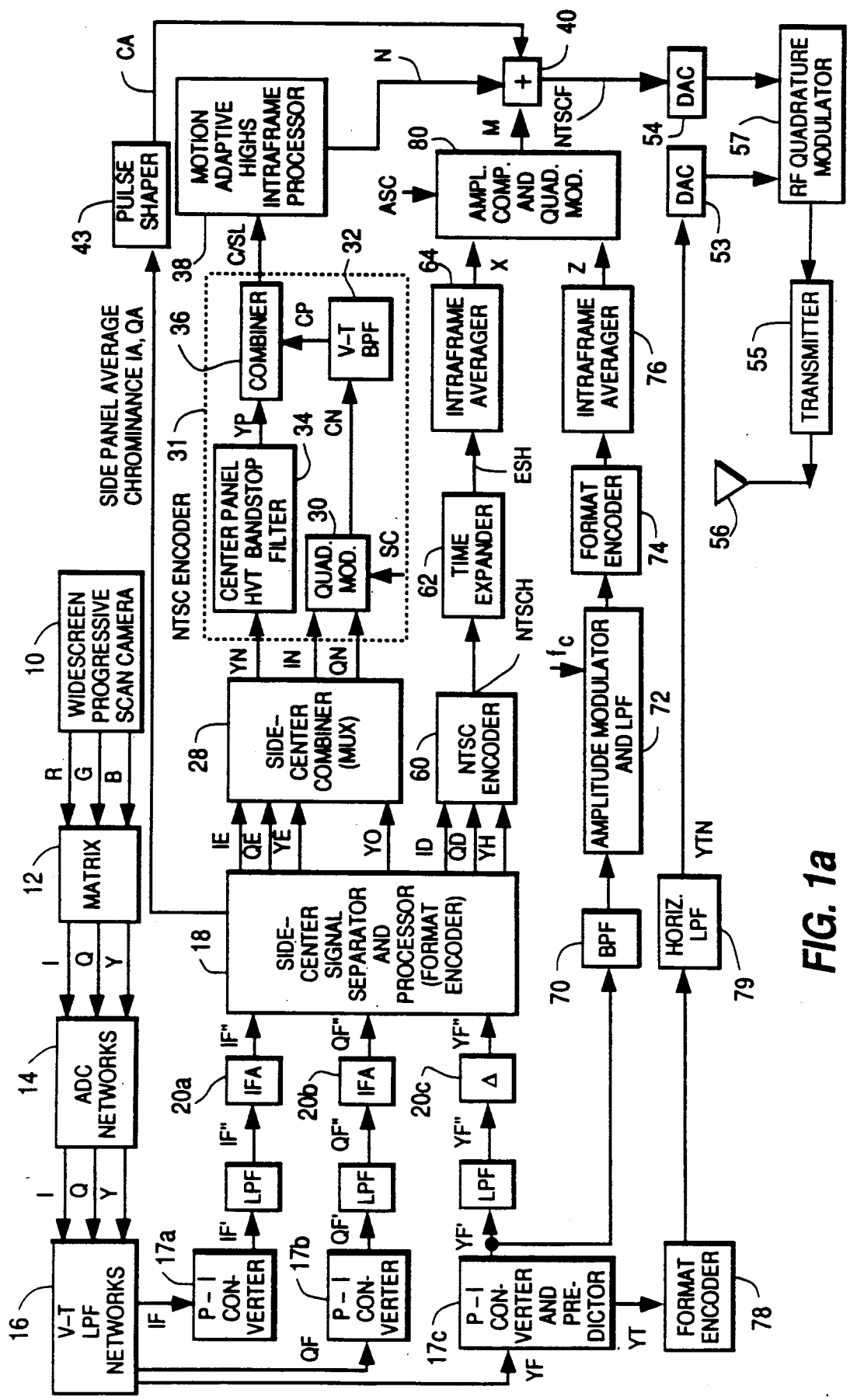
FIG. 1a is a block diagram showing additional details of the encoder system of FIG. 1.

The widescreen EDTV system is shown in greater detail in FIG. 1a. A 525 line, 60 field/sec. widescreen progressive scan camera 10 provides a widescreen color signal with R, G, B components and a wide aspect ratio of 5:3 in this example. An interlaced signal source could also be used, but a progressive scan signal source produces superior results.

The color video signal processed by the encoder system of FIGS. 1 and 1a contains both luminance and chrominance signal components. The luminance and chrominance signals contain both low and high frequency information, which in the following discussion will be referred to as "lows" and "highs", respectively.

The wide bandwidth widescreen progressive scan color video signals from camera 10 are matrixed in a unit 12 to derive luminance component Y and color difference signal components I and Q from the R, G, B color signals. Wideband progressive scan signals Y, I, Q are sampled at an eight-times chrominance subcarrier rate ($8 \times fsc$), and are converted from analog to digital (binary) form individually by separate analog-to-digital converters in an ADC unit 14 before being filtered individually by separate vertical-temporal (V-T) low pass filters in a filter unit 16 to produce filtered signals YF, IF and QF. The separate filters are $3 \times 3$ (pixel) linear time invariant filters. These filters reduce vertical-temporal resolution slightly, particularly diagonal V-T resolution, to prevent unwanted interlace artifacts (such as flicker and jagged edges, for example) in the main signal (component 1 in FIG. 1) after progressive scan to interlace conversion. The filters maintain nearly full vertical resolution in stationary portions of the image.

The center panel expansion factor (CEF) is a function of the difference between the width of an image displayed by a widescreen receiver and the width of an image displayed by a standard receiver. The image width of a widescreen display with a 5:3 aspect ratio is 1.25 times greater than the image width of a standard display with a 4:3 aspect ratio. This factor of 1.25 is a preliminary center panel expansion factor which must be adjusted to account for the overscan region of a standard receiver, and to account for an intentional slight overlap of the boundary regions between the center and side panels as will be explained. These considerations dictate a CEF of 1.19.

The progressive scan signals from filter network 16 exhibit a bandwidth of 0–14.32 MHz and are respectively converted into 2:1 interlaced signals by means of progressive scan (P) to interlace (I) converters 17a, 17b and 17c, details of which are shown in U.S. Pat. No. 4,855,811. Output signals IF', QF' and YF' from converters 17a–17c exhibit a bandwidth of 0–7.16 MHz since the horizontal scanning rate for interlaced signals is half that of progressive scan signals. In the conversion process, the progressive scan signal is subsampled, taking half the available pixel samples to produce the 2:1 interlaced main signal. Specifically, each progressive scan signal is converted to 2:1 interlaced format by retaining either the odd or even lines in each field and reading out the retained pixels at a $4 \times fsc$ rate (14.32 MHz). All subsequent digital processing of the interlaced signals occurs at the $4 \times fsc$ rate. In a progressively scanned system a complete image, an image frame, is produced by each complete vertical image scan. In an interlaced system, a complete image is produced by a combination of two successive interlaced vertical field scans which together constitute an image frame.

Network 17c also includes an error prediction network. One output of network 17c, YF', is the interlaced subsampled luminance version of the prefiltered progressive scan component. Another output (luminance) signal of network 17c, YT, comprises vertical-temporal information derived from image field difference information and represents a temporal prediction, or temporal interpolation, error between actual and predicted values of luminance samples "missing" at the receiver. The prediction is based on a temporal average of the amplitudes of "before" and "after" pixels, which are available at the receiver. Signal YT, a luminance "helper" signal that assists to reconstruct the progressive scan signal at the receiver, essentially accounts for an error that the receiver is expected to make with respect to non-stationary image signals and facilitates cancellation of such error at the receiver. In stationary portions of an image the error is zero, and perfect reconstruction is performed at the receiver. The algorithm used to develop helper signal YT is disclosed in U.S. Pat. No. 4,855,811.

Interlaced widescreen signals IF', QF' and YF' from converters 17a-17c are respectively filtered by horizontal lowpass filters 19a, 19b and 19c before being intraframe averaged (IFA) and delayed (Δ) by units 20a, 20b and 20c respectively to produce a signal IF" with a bandwidth of 0-600 KHz, a signal QF" with a bandwidth of 0-600 KHz, and a signal YF" with a bandwidth of 0-5 MHz. These signals are next subjected to a format encoding process which encodes each of these signals into a 4:3 format by means of format encoding apparatus associated with a side-center signal separator and processor unit 18. Briefly, the center portion of each widescreen line is time-expanded and mapped into the displayed portion of the active line time with a 4:3 aspect ratio. Time expansion causes a decrease in bandwidth so that the original widescreen interlaced frequencies are made compatible with the standard NTSC bandwidth. The side panel luminance component is split into horizontal frequency bands so that the luminance highs component YH exhibits a bandwidth of 700 KHz-5.0 MHz. The side panel luminance lows, i.e., signal YO, includes a DC component and is time-compressed and mapped into the left and right horizontal image overscan regions on each line. The side panel highs and side panel chrominance information are processed separately as discussed below.

Filtered interlaced signals IF", QF" and YF" are processed by format encoder 18 to produce four groups of output signals: YE, IE and QE; YO; YH, ID and QD; and average I and Q side panel chrominance information IA and QA. Signals YE, IE and QE represent full bandwidth center panel components, with signal YO representing side panel luminance lows compressed into horizontal overscan regions. Signal YH represents side panel high frequency luminance information exclusive of low frequency information, signals ID, QD represent the side panel chrominance difference information, and signals IA, QA respectively represent the average value of chrominance components I and Q over the side panel region. When these signals are combined, an NTSC compatible widescreen signal with a 4:3 display aspect ratio is produced. Signals YE, IE, QE, YO and YH can be developed using apparatus as shown in U.S. Pat. No. 4,855,811.

Signals ID and QD, the sidepanel chrominance difference signals obtained by subtracting average sidepanel chrominance information IA and QA from the original chrominance information, ultimately modulate an auxiliary subcarrier. Average chrominance components IA, QA are shaped, multiplexed and mapped into the so-called "back porch" portion of the horizontal blanking interval as will be discussed subsequently.

Figure 3:
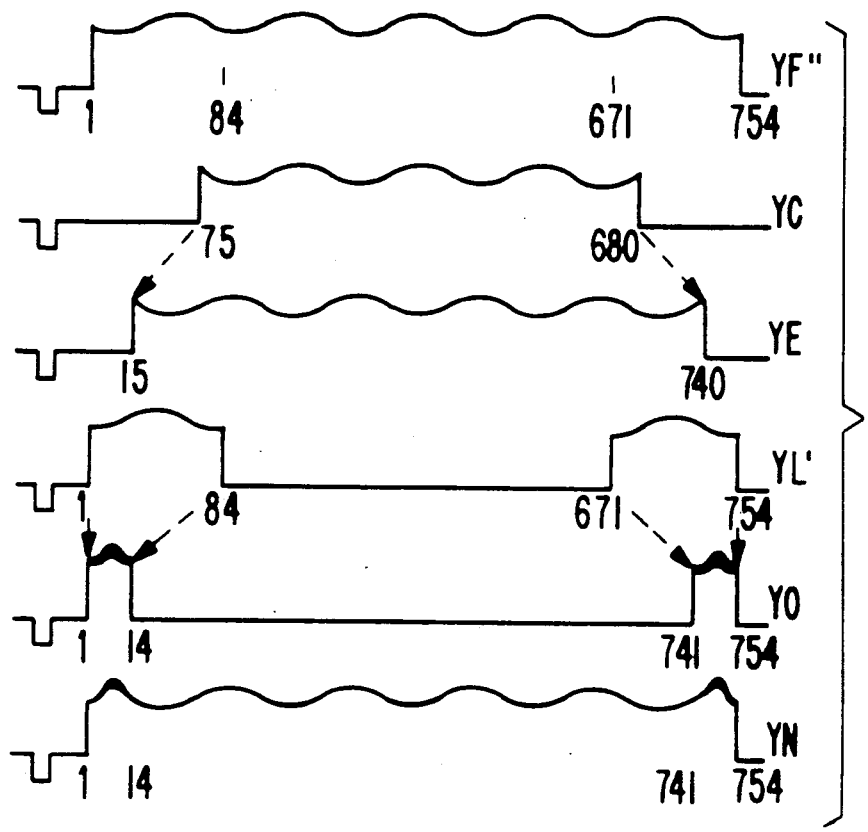

Signals YE, IE and QE contain complete center panel information and exhibit the same format, as indicated by signal YE in FIG. 3. Briefly, signal YE is derived from signal YF" as follows. Widescreen signal YF" contains pixels 1-754 occurring during the active line interval of the widescreen signal, containing side and center panel information. The center panel information (pixels 75-680) is extracted as a center panel luminance signal YC via a time de-multiplexing process. Signal YC is time expanded by the center panel expansion factor of 1.19 (i.e., 5.0 MHz/4.2 MHz) to produce NTSC compatible center panel signal YE. Signal YE exhibits an NTSC compatible bandwidth (0-4.2 MHz) due to the time expansion by factor 1.19. Signal YE occupies the picture display interval between left and right horizontal overscan regions. Signals IE and QE are developed from signals IF" and QF", respectively, and are similarly processed in the manner of signal YE.

Signal YO represents the low frequency luminance side panel information ("lows") which is inserted into the left and right horizontal overscan regions. The horizontal overscan regions are devoid of side panel chrominance information. Signal YO exhibits the format shown in FIG. 3. Briefly, signal YO is derived from signal YF" as follows. Widescreen signal YF contains left panel information associated with pixels 1-84 and right panel information associated with pixels 671-754. As will be discussed, signal YF" is low pass filtered to produce a luminance lows signal with a 0-700 KHz bandwidth, from which signal a left and right side panel lows signal is extracted (signal YL' in FIG. 3) via a time de-multiplexing process. Luminance lows signal YL' is time compressed to produce side panel lows signal YO with compressed low frequency information in the horizontal overscan regions associated with pixels 1-14 and 741-754. The compressed luminance side lows signal exhibits an increased BW proportional to the amount of time compression.

Signals YE, IE, QE and YO are combined by a side-center signal combiner 28, e.g. a time multiplexer, to produce signals YN, IN and QN with an NTSC compatible bandwidth and a 4:3 aspect ratio. These signals are of the form of signal YN shown in FIG. 3. Combiner 28 also includes appropriate signal delays for equalizing the transit times of the signals being combined. Such equalizing signal delays are also included elsewhere in the system as required to equalize signal transit times.

A modulator 30 of conventional design, bandpass filter 32, center panel H-V-T bandstop filter 34 and combiner 36 constitute an improved NTSC signal encoder 31. Chrominance signals IN and QN are quadrature modulated on a subcarrier SC at the NTSC chrominance subcarrier frequency, nominally 3.58 MHz, by modulator 30 to produce a modulated signal CN. Modulated signal CN is bandpass filtered in the vertical (V) and temporal (T) dimensions by means of V-T filter 32, which removes crosstalk artifacts in the interlaced chrominance signal before it is applied to a chrominance signal input of combiner 36 as a signal CP. Luminance signal YN is bandstop filtered in the horizontal (H), vertical (V) and temporal (T) dimensions by means of three-dimensional H-V-T bandstop filter 34 before being applied, as a signal YP, to a luminance input of combiner 36. Filter 34 provides bandstop filtering only in the center panel region. Filtering luminance signal YN and chrominance color difference signals IN and QN serves to assure that luminance-chrominance crosstalk will be significantly reduced after subsequent NTSC encoding.

H-V-T bandstop filter 34 in FIG. 1a removes upwardly moving diagonal frequency components from luminance signal YN. These frequency components are similar in appearance to chrominance subcarrier components and are removed to make a hole in the frequency spectrum into which modulated chrominance will be inserted. The removal of the upwardly moving diagonal frequency components from luminance signal YN does not visibly degrade a displayed picture because it has been determined that the human eye is substantially insensitive to these frequency components. Filter 34 exhibits a cut-off frequency of approximately 1.5 MHZ so as not to impair luminance vertical detail information.

Figure 4:
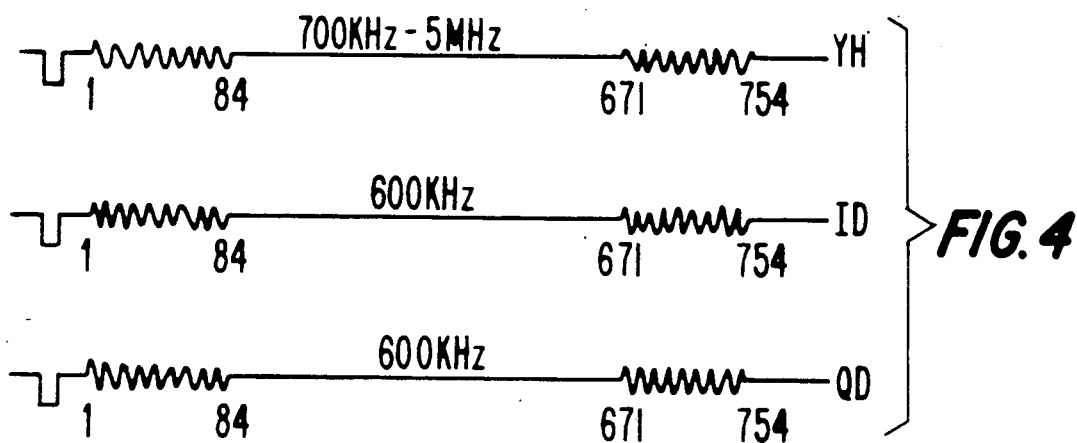

An output center/side lows signal C/SL from combiner 36 contains NTSC compatible information to be displayed, as derived from the center panel of the widescreen signal, as well as compressed left and right side panel luminance lows situated in the left and right horizontal overscan regions not seen by a viewer of an NTSC receiver display. The compressed side panel luminance lows in the overscan region represent one constituent part of the side panel information for a widescreen display. The other constituent parts, the side panel luminance highs YH and side panel chrominance difference information ID and QD are developed by processor 18 as will be discussed below. Signals YH, ID and QD are shown in FIG. 4.

The center panel portion of signal C/SL is processed by intraframe averager 38 to produce a signal N, which is applied to an input of an adder 40. Intraframe averaged signal N is essentially identical to signal C/SL because of the high spatial correlation of intraframe image information of signal C/SL. Averager 38 averages the center panel portion of signal C/SL above approximately 1.5 MHz and helps to reduce or eliminate vertical-temporal crosstalk between the main and auxiliary signals. The highpass frequency range of 1.5 MHz and above over which intraframe averager 38 operates was chosen to assure that full intraframe averaging is accomplished for information at 2 MHz and above, to prevent luminance vertical detail information from being degraded by the process of intraframe averaging. Horizontal crosstalk is eliminated by means of a 200 KHz guardband between a filter associated with intraframe averager 38 in encoder 31 and a filter associated with an intraframe averager-differencer unit in the decoder of FIG. 7. It is not necessary for units 34 and 38 to provide filtering in the horizontal overscan regions since side panel chrominance information is not conveyed in the horizontal overscan regions. Thus side panel luminance motion rendition is not degraded by filtering effects associated with units 34 and 38.

Figure 5:
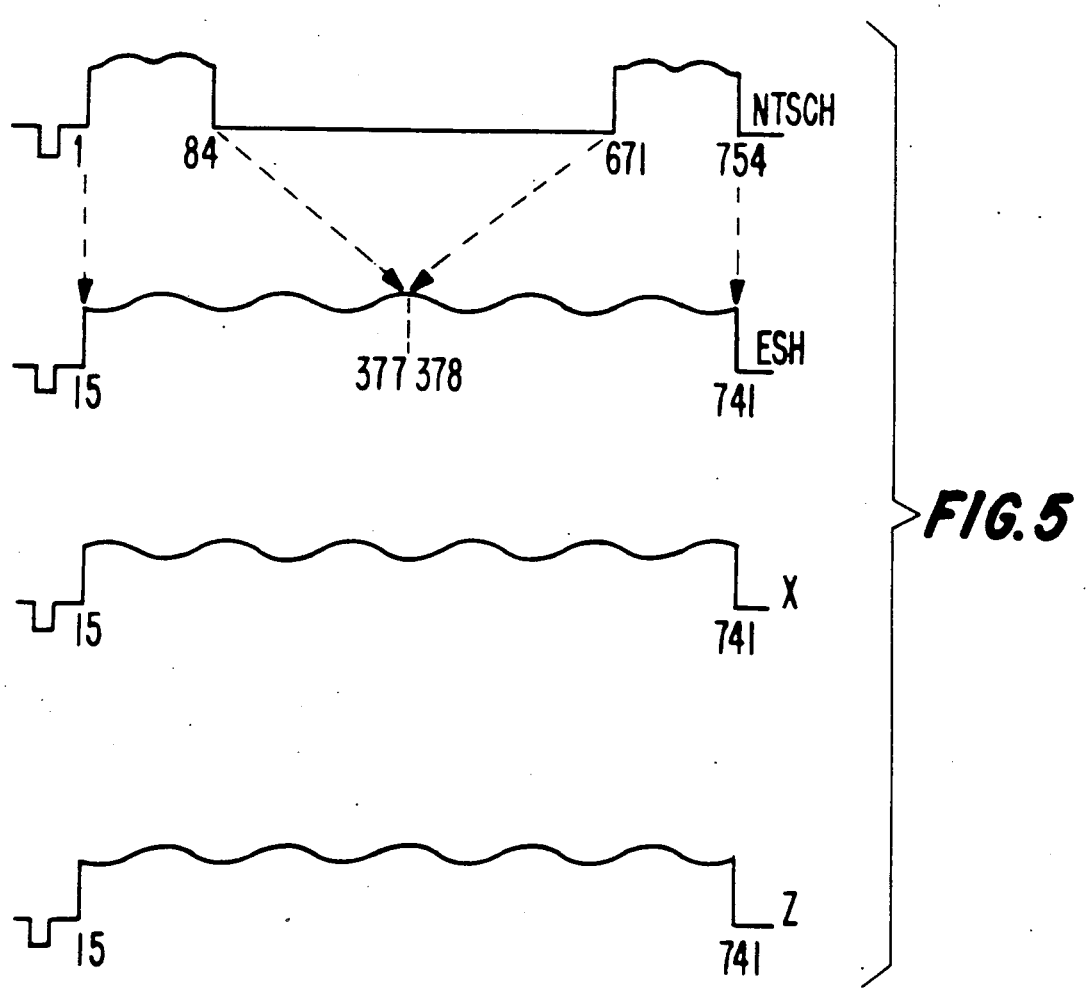

Side panel signals ID, QD and YH are placed in NTSC format by means of an NTSC encoder 60 which is similar to encoder 31. Encoder 60 includes apparatus for quadrature modulating side panel chrominance difference information ID, QD onto the side panel luminance highs information YH at 3.58 MHz, to produce side panel signal NTSCH in NTSC format. This signal is illustrated by FIG. 5.

Signal NTSCH is time expanded by a unit 62 to produce an expanded side panel information signal ESH. As shown in FIG. 5, the expansion is accomplished by a "mapping" process which maps left side panel pixels 1-84 of signal NTSCH into pixel positions 15-377 of signal ESH, i.e., the left side panel information of signal NTSCH is expanded to occupy approximately one half the line time of signal ESH. The right side panel information (pixels 671-754) of signal NTSCH is similarly processed. The time expansion process reduces the horizontal bandwidth of the information comprising signal ESH (compared to that of signal NTSCH) by a factor of 362/84. Signal ESH is intra-frame averaged by a network 64 to produce a signal X as illustrated in FIG. 5. Intraframe averaged signal X is essentially identical to signal ESH because of the high spatial correlation of intraframe image information of signal ESH. Signal X is applied to a signal input of a quadrature modulator 80.

In this system side panel chrominance components IA and QA are ultimately combined with side panel chrominance components ID and QD after these signals are intraframe averaged by unit 64 for the reasons mentioned previously. Signals IA and QA are also subjected to a similar intraframe averaging (time filtering) process to reduce or eliminate the likelihood of color flicker being produced along chrominance edges when signals IA, QA and ID, QD are combined. Thus components IA and QA are subjected to intraframe averaging via units 20a and 20b respectively. Signals ID and QD are intraframe averaged twice, by units 20a and 20b respectively, and by unit 64. Such sequential intraframe averaging produces the same filtering effect as intraframe averaging a given signal once.

Signal YF' is also filtered by a horizontal bandpass filter 70 with a passband of 5 MHz-60 MHz. The output signal from filter 70, horizontal luminance highs, is applied to an amplitude modulator 72 where it amplitude modulates a 5 MHz carrier signal $f_c$. Modulator 72 includes an output low pass filter with a cut-off frequency of approximately 1.0 MHz to obtain a signal with a 0-1.0 MHz passband at the output of modulator 72. The other output components produced by the modulation process (5.0-6.0 MHz and 10.0-11.0 MHz) are removed by lowpass filtering. Effectively, horizontal luminance highs frequencies in the range 5.0 MHz-6.0 MHz have been shifted to the range 0-1.0 MHz as a result of the amplitude modulation process and subsequent low pass filtering.

The frequency-shifted horizontal luminance highs signal from unit 72 is encoded by means of a format encoder 74 to spatially correlate this signal with the main signal, C/SL. Encoder 74 is similar to format encoding networks associated with units 18 and 28 for the purpose of expanding the center panel information, so that the frequency shifted horizontal luminance highs are encoded into a standard 4:3 format. When the input signal to encoder 74 is time expanded, its bandwidth drops to approximately 1.0 MHz from 1.2 MHz, and the output signal from encoder 74 becomes spatially correlated with the main signal. The side panel information is lowpass filtered within unit 72 to 170 KHz before being time-compressed by encoder 74. The signal from encoder 74 is intraframe averaged before being applied to unit 80 as signal Z. Intraframe averaged signal Z is essentially identical to the signal from encoder 74 because of the high spatial correlation of intraframe image information of the signal from encoder 74. Modulating signals X and Z exhibit substantially the same bandwidth, approximately 0-1.1 MHz.

Unit 80 performs nonlinear gamma function amplitude compression on large amplitude excursions of auxiliary signals X and Z before these signals quadrature modulate an auxiliary subcarrier signal ASC. The amplitude compressed signals are quadrature modulated on a 3.1075 MHz phase-controlled auxiliary subcarrier ASC, which is an odd multiple of one half the horizontal line frequency ($395 \times H/2$). The phase of the auxiliary subcarrier reverses between fields 262H apart, unlike the phase of a conventional chrominance subcarrier. The field alternating phase of the auxiliary subcarrier permits the auxiliary modulating information of signals X and Z to overlap chrominance information and facilitates the separation of the auxiliary information using a relatively uncomplicated field storage device at the receiver. Quadrature modulated signal M is added to signal N in adder 40.

Signal CA, representative of processed side panel average chrominance information, is inserted into the back porch portion of the horizontal blanking interval of signal N. Sidepanel average chrominance information signal CA from a pulse shaper 43 comprises dual pulse components which are multiplexed into the back porch portion of each horizontal line blanking interval. For a given horizontal line, one of the pulses represents left side panel average "I" chrominance information and the other pulse represents left side panel average "Q" chrominance information. In the next horizontal line blanking interval, one of the pulses represents right side panel average "I" information, and the other pulse represents right side panel average "Q" information. Thus average left and right side panel chrominance information is sent during the back porch interval of alternate lines.

An output signal NTSCF from adder 40 is a 4.2 MHz NTSC compatible signal. Components 2 and 3 of signal NTSCF are slightly time compressed to spatially align these components with the center panel portion of component 1, as illustrated by FIG. 1. The only image information appearing in the horizontal overscan regions is time compressed side panel lows information. Thus the need for intraframe averaging during the horizontal overscan regions is avoided, whereby the diagonal resolution of side panel low frequency luminance information is not degraded.

Luminance helper signal YT exhibits a bandwidth of 7.16 MHz and is encoded into the 4:3 format (in the same manner as accomplished by encoder 74) by means of a format encoder 78, and is horizontally lowpass filtered to 750 KHz by a filter 79 to produce a signal YTN. The side portions are lowpass filtered to 125 KHz before time compression by means of an input lowpass filter of format encoder 78. The side portion highs are discarded. Thus signal YTN is spatially correlated with main signal C/SL.

Signals YTN and NTSCF are converted from digital (binary) to analog form by means of DAC units 53 and 54 respectively, before these signals are applied to an RF quadrature modulator 57 for modulating a television RF carrier signal. The RF modulated signal is afterwards applied to a transmitter 55 for broadcast via an antenna 56.

Quadrature modulation such as provided by unit 80 advantageously permits two narrowband signals to be transmitted simultaneously. Time expanding the modulating signals results in a bandwidth reduction, consistent with the narrowband requirements of quadrature modulation. The more the bandwidth is reduced, the less likely it is that interference between the carrier and modulating signals will result. Furthermore, the typically high energy DC component of the side panel luminance information is compressed into the overscan region rather than being used as a modulating signal. In addition, the relatively high energy associated with average side panel chrominance information is conveyed during the back porch portion of each horizontal blanking interval. The side panel information modulating component of the auxiliary subcarrier contains only high frequency side panel luminance information and information representative of the difference between the original side panel chrominance information and the average side panel chrominance information. Thus the energy of the modulating signal, and therefore the potential interference of the modulating signal, are greatly reduced.

Figure 7:
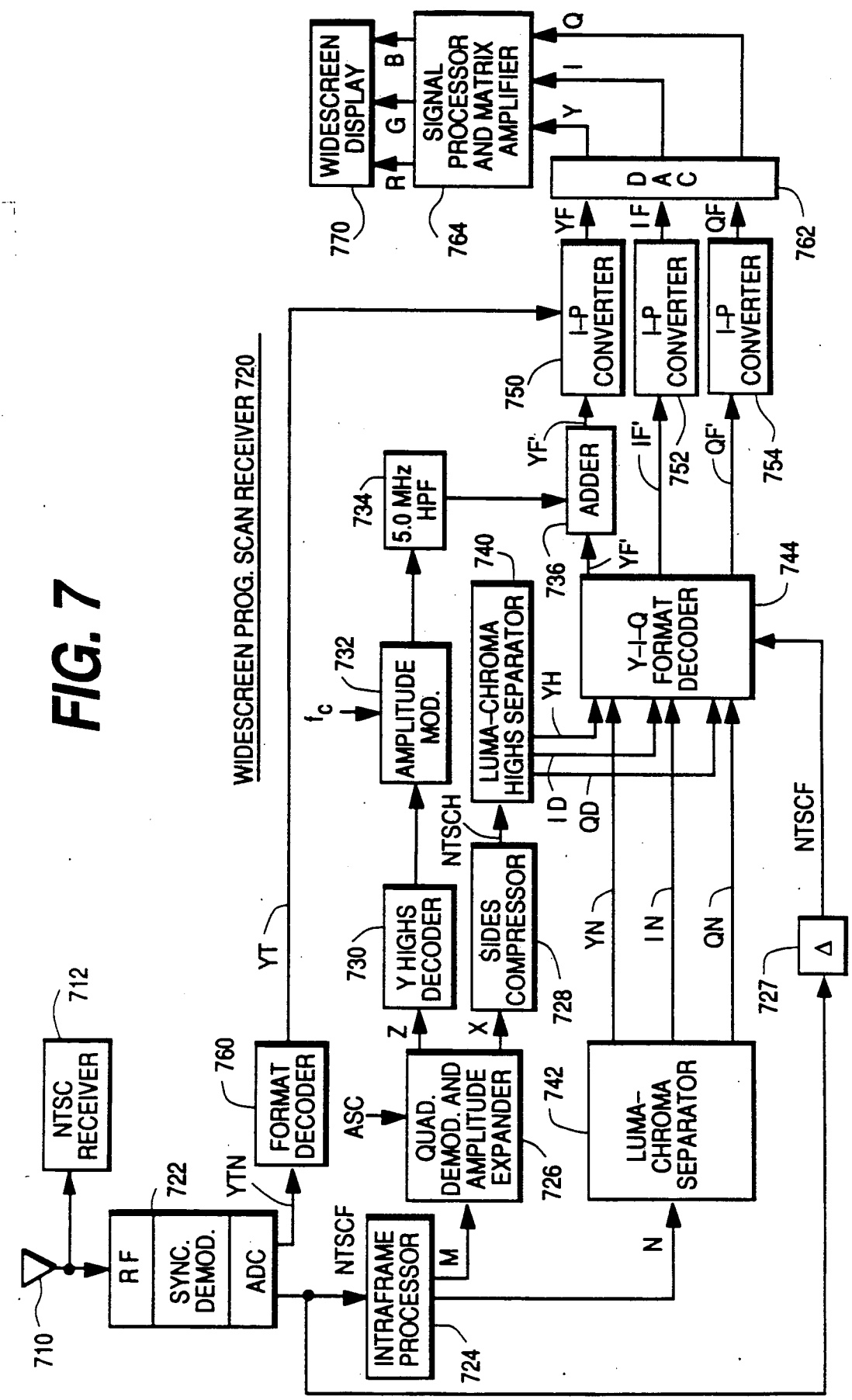
FIG. 7 shows a block diagram of a portion of a widescreen EDTV receiver including decoder apparatus in accordance with the present invention.

The encoded NTSC compatible widescreen signal broadcast by antenna 56 is intended to be received by both NTSC receivers and widescreen receivers, as illustrated by FIG. 7. A compatible widescreen EDTV interlaced television signal is received by an antenna 710 and applied to an antenna input of an NTSC receiver 712. Receiver 712 processes the compatible widescreen signal in normal fashion to produce an image display with a 4:3 aspect ratio, with the widescreen side panel luminance information being in part compressed (i.e., "lows") into the horizontal overscan regions out of sight of the viewer, and being in part contained in the modulated auxiliary subcarrier signal which does not disrupt the standard receiver operation.

The compatible widescreen EDTV signal received by antenna 710 is also applied to a widescreen progressive scan receiver 720 capable of displaying a video image with a wide aspect ratio of, e.g., 5:3. The received widescreen signal is processed by an input unit 722 including radio frequency (RF) tuner and amplifier circuits, a synchronous video demodulator (a quadrature demodulator) which produces a baseband video signal, and analog-to-digital (ADC) converter circuits for producing a baseband video signal (NTSCF) in binary form. The ADC circuits operate at a sampling rate of four times the chrominance subcarrier frequency (4×fsc).

Signal NTSCF is applied to an intraframe averager-differencer unit 724 which averages (additively combines) and differences (subtractively combines) image lines 262H apart within frames, above 1.7 MHz, to recover main signal N and quadrature modulated signal M substantially free from V-T crosstalk. A 200 KHz horizontal crosstalk guardband is provided between the 1.7 MHz lower limit operating frequency of unit 724 and the 1.5 MHz lower limit operating frequency of unit 38 in the encoder of FIG. 1a. Recovered signal N contains information which is essentially visually identical to image information of main signal C/SL, due to the high visual (spatial) intraframe image correlation of original main signal C/SL as intraframe averaged in the encoder of FIG. 1a.

Signal M is coupled to a quadrature demodulator and amplitude expander unit 726 for demodulating auxiliary signals X and Z in response to an auxiliary subcarrier ASC with a field reversing phase, similar to signal ASC discussed in connection with FIG. 1a. Demodulated signals X and Z contain information which is essentially visually identical to image information of signal ESH and of the output signal from unit 74 in FIG. 1a, due to the high spatial intraframe image correlation of these signals as intraframe averaged by the encoder of FIG. 1a. Unit 726 also includes a 1.5 MHz lowpass filter to remove unwanted high frequency demodulation products at twice the auxiliary subcarrier frequency, and an amplitude expander for expanding the (previously compressed) demodulated signals using a gamma function which is the inverse of the non-linear compression function performed by unit 80 in FIG. 1a.

A unit 728 time compresses the encoded side panel components so that they occupy their original time slots, thereby recovering signal NTSCH. Unit 728 time compresses signal NTSCH by the same amount that unit 62 of FIG. 1a time expanded signal NTSCH.

A luminance (Y) highs decoder 730 decodes luminance horizontal highs signal Z into widescreen format. The sides are time expanded (by the same amount as sides time compression in the encoder of FIG. 1a), and the center is time compressed (by the same amount as sides time expansion in the encoder of FIG. 1a). The panels are spliced together in a 10-pixel overlap region.

Figure 10:
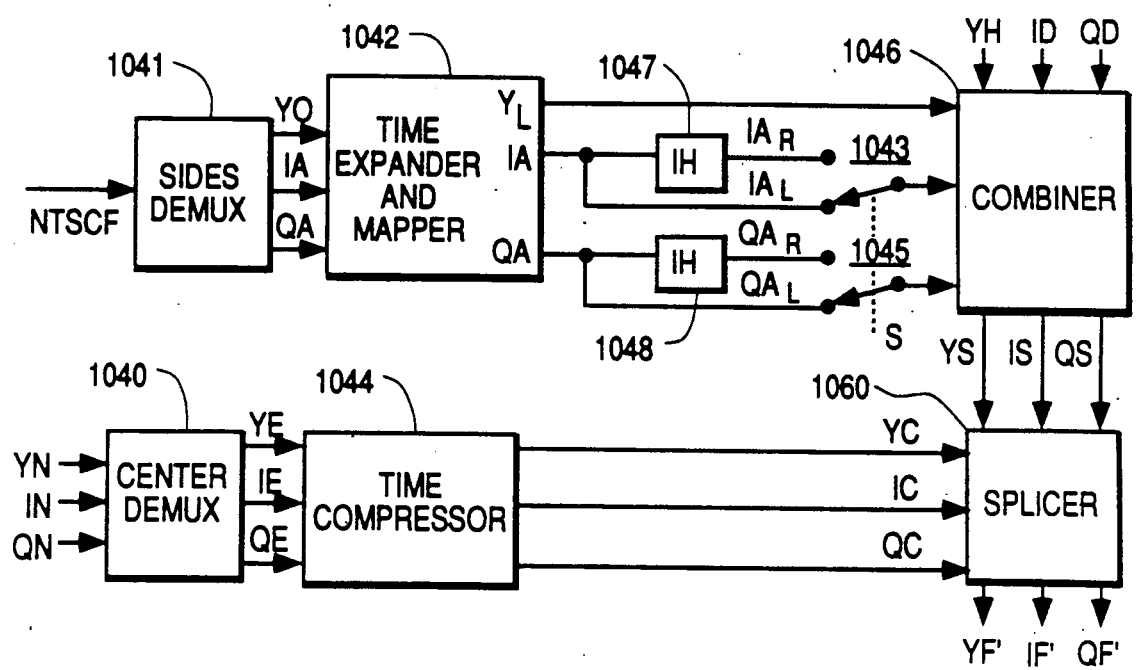

Modulator 732 amplitude modulates the signal from decoder 730 on a 5.0 MHz carrier $f_c$. The amplitude modulated signal is afterwards high pass filtered by a filter 734 with a 5.0 MHz cut-off frequency to remove the lower sideband. In the output signal from filter 734, center panel frequencies of 5.0 to 6.0 MHz are recovered. The signal from filter 734 is applied to an adder 736. Signal NTSCH from compressor 728 is applied to a luminance-chrominance separator 740 for separating the side panel luminance information from the side panel chrominance information to produce side panel luminance highs signal YH and side panel chrominance difference signals ID and QD. Signal N from unit 724 is separated into its constituent luminance and chrominance components YN, IN and QN by means of a luminance-chrominance separator 742, which can be similar to separator 740. Signals YH, ID, QD and YN, IN, QN are provided as inputs to a Y-I-Q format decoder 744, which decodes the luminance and chrominance components into widescreen format. Decoder 744 also receives signal NTSCF from the output of unit 722 via a transit time equalizing delay network 727. This signal contains the average side panel chrominance information. In network 744 the side panel luminance lows are time expanded, the center panel is time compressed, the side panel luminance highs and side panel chrominance information are added to the side panel luminance lows, and the side panels are spliced to the center panel in the 10-pixel overlap region. Details of decoder 744 are shown in FIG. 10.

Signal YF' is coupled to adder 736 where it is summed with the signal from filter 734. By this process recovered extended high frequency horizontal luminance detail information is added to decoded luminance signal YF'.

Signals YF', IF' and QF' are converted from interlaced to progressive scan format by means of converters 750, 752 and 754, respectively. Luminance progressive scan converter 750 also responds to "helper" luminance signal YT from a format decoder 760, which decodes encoded "helper" signal YTN. Decoder 760 decodes signal YTN into widescreen format.

I and Q converters 752 and 754 convert interlace to progressive scan signals by temporally averaging lines one frame apart to produce the missing progressive scan line information. This can be accomplished by apparatus of the type shown in U.S. Pat. No. 4,855,811. Luminance progressive scan converter unit 750 is similar, except that signal YT is added to signal X as received by the dual-port memory. In this unit a "helper" signal sample, YT, is added to a temporal average to assist reconstructing a missing progressive scan pixel sample. Full temporal detail is recovered within the band of horizontal frequencies contained in the encoded line difference signal (750 KHz, after encoding). Above this band of horizontal frequencies signal YT is zero, so the missing sample is reconstructed by temporal averaging.

Widescreen progressive scan signals YF, IF and QF are converted to analog form by means of a digital-to-analog converter 762 before being applied to a video signal processor and matrix amplifier unit 764. The video signal processor component of unit 764 includes signal amplifying, DC level shifting, peaking, brightness control, contrast control and other conventional video signal processing circuits. Matrix amplifier 764 combines luminance signal YF with color difference signals IF and QF to produce color image representative video signals R, G and B. These color signals are amplified by display driver amplifiers in unit 764 to a level suitable for directly driving a widescreen color image display device 770, e.g., a widescreen kinescope.

Figures 6, 6A:
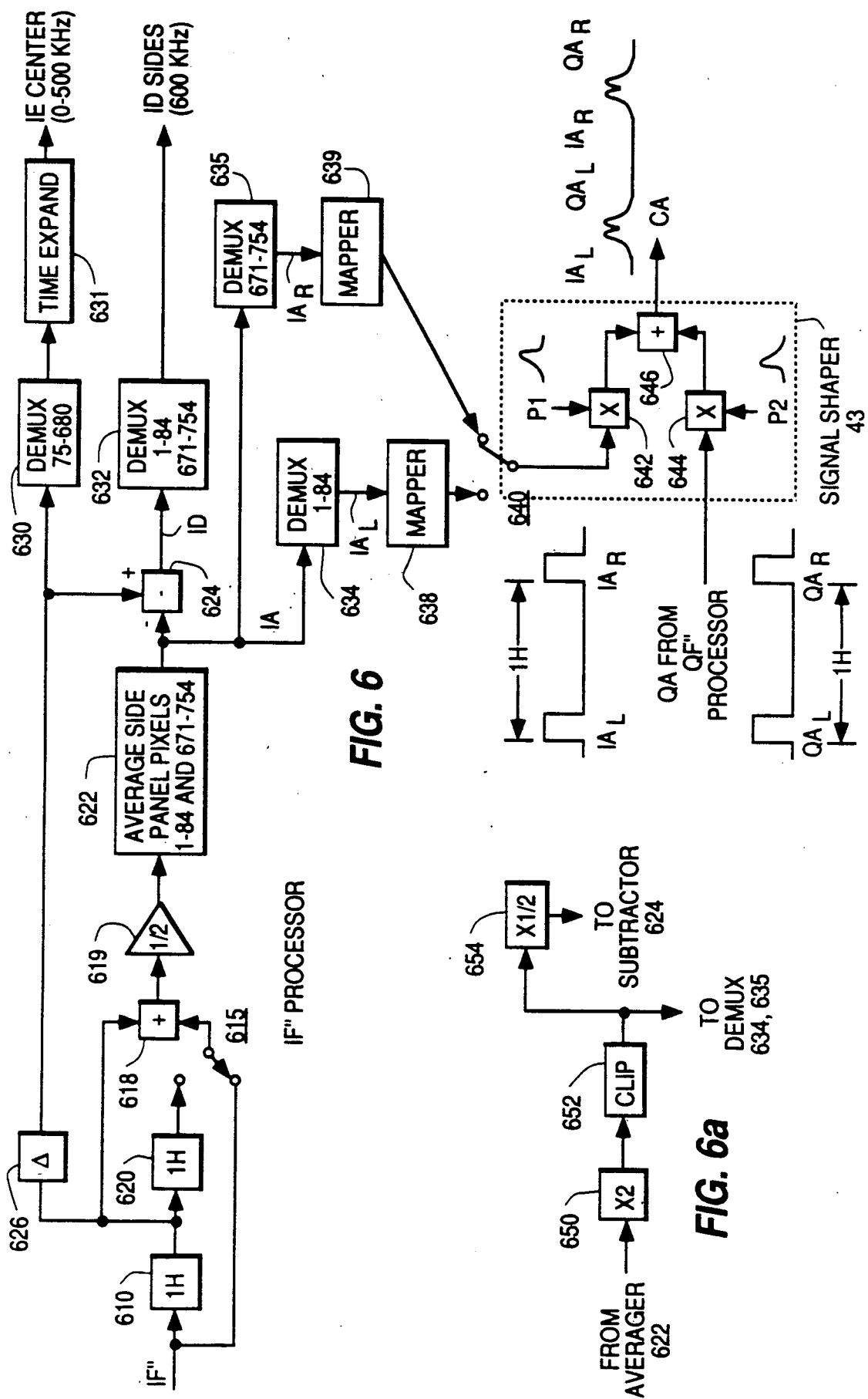
FIGS. 6, 6a and 10 illustrate aspects of the disclosed system in greater detail.

FIG. 6 illustrates apparatus associated with unit 18 of FIG. 1a for producing chrominance signals IE, ID, QD and IA, QA. FIG. 6 also shows signal shaping network 43 for producing side panel chrominance average signal CA. An initial portion of the apparatus of FIG. 6 is a network for processing signal IF" to produce output signals IE, ID and a processed version of signal IA for application to signal shaper 43. Similar apparatus responsive to signal QF" can be used to develop corresponding signals QE, QD and QA.

Signal IF" is applied to an input network including 1H delay elements 610 and 620. A "current" image line appears at the output of delay 610, and preceding and succeeding lines appear at the output of delay 620 and at the input of delay 610, respectively. Signal IF" from the output of delay 610 is conveyed via a transit time equalizing delay 626 to a demultiplexer 630 which extracts the center panel information as signal IC, which is time expanded by network 631 to produce center panel component IE.

A switch 615, synchronized at the horizontal line rate, switches between preceding and succeeding lines. Switch 615 switches its position in the middle of each line to obtain a vertical average of adjacent lines by pairing two lines together in combination with an adder 618. A vertically averaged signal from adder 618 is multiplied by a factor of one-half in a network 619. The weighted signal from network 619 is applied to a unit 622 which provides an output signal IA representative of horizontally averaged left side panel information and horizontally averaged right side panel information. That is, unit 622 creates two averages per line as signal IA. The average side panel chrominance information from unit 622 is subtracted from the original "I" chrominance information signal IF" in a subtractive combiner 624 to produce output chrominance difference signal ID. This signal is demultiplexed by a center/side demultiplexer 632 to produce a signal ID with separated left and right side components each representative of a difference between the original "I" chrominance information and the average side panel chrominance information.

Average side panel chrominance information signal IA from unit 622 is demultiplexed into left and right side panel average chrominance components $IA_L$ and $IA_R$ by means of center/side demultiplexers 634 and 635 respectively. Signal component $IA_L$ is mapped by a mapper 638 to a predetermined location in the horizontal back porch interval of the video signal. Signal component $IA_R$ is mapped to a corresponding location in the next image line by means of a mapper 639. The outputs of mappers 638 and 639 are selected by a horizontal line rate switch 640. An output signal IA from switch 640, containing average left and right side panel components $IA_L$ and $IA_R$ as illustrated by the waveform is applied to signal shaper 43 for developing a pulse waveform from the switch output signal.

Figure 9:
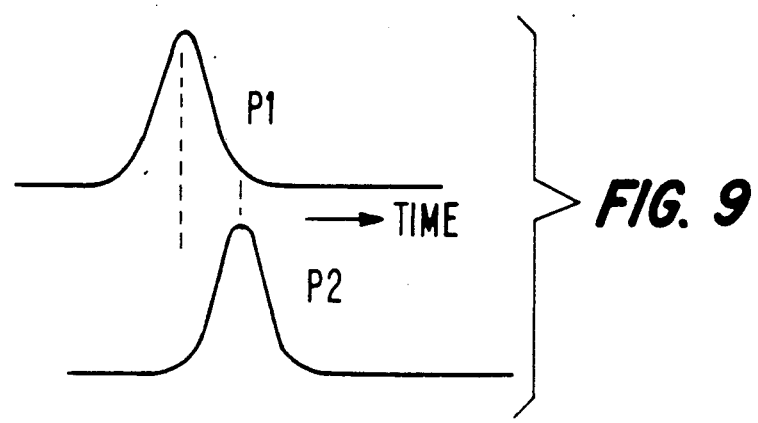

Shaper 43 includes signal multipliers 642 and 644 and an adder 646 which sums output signals from the multipliers. Multiplier 642 responds to a first reference pulse sequence P1, which is a periodic pulse of prescribed amplitude, duration and risetime. Multiplier 644 responds to a second reference pulse sequence P2 which is a periodic pulse of similar amplitude and duration. Pulses P1 and P2 exhibit a timing offset, e.g., pulses P2 appear slightly later than pulses P1 as shown in FIG. 9. Multiplier 642 also responds to signal IA from switch 640, and multiplier 644 also responds to an associated signal QA from a QF" processor (not shown).

The outputs of multipliers 642 and 644 are combined in an adder 646 to produce signal CA representative of average side panel I and Q chrominance information. Signal CA exhibits left side pulse components $IA_L$, $QA_L$ on odd numbered horizontal lines, and right side pulse components $IA_R$ and $QA_R$ on even numbered horizontal lines as shown by the waveform. Other approaches are also possible. For example, pulse components $IA_L$, $QA_L$, $IA_R$ and $QA_R$ could be sent sequentially during a given blanking interval, or these components could be sent separately on four successive lines, or left and right side information could be sent during even and odd fields respectively.

Figure 8:
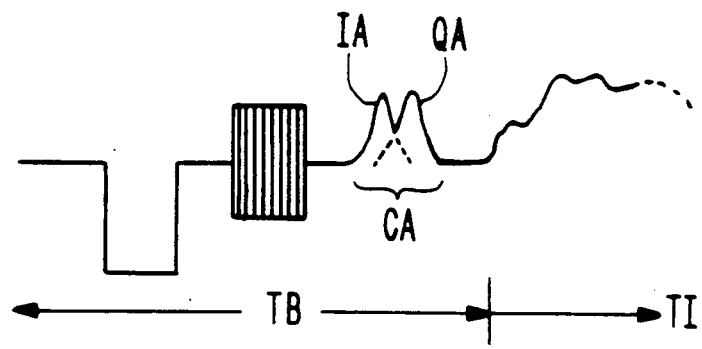

FIG. 8 depicts the placement of components IA, QA after the chrominance burst interval within the backporch segment of a given horizontal blanking interval (TB) between image intervals (TI). Reference pulses P1 and P2 are shown in FIG. 9. Pulses P1 and P2, and thereby pulses IA and QA, have a risetime which precludes ringing when pulses IA and QA pass through analog filters in the RF transmitter portion of the FIG. 1a encoder system. Pulses IA, QA exhibit an overlapping configuration to conserve space within the back-porch interval, and illustratively exhibit a common crossover point (between the pulse peaks) at an amplitude of about 0.7 times the peak amplitude. The pulses can exhibit a positive amplitude excursion to about 100 IRE in a white-going direction, and should not result in clipping at the transmitter. Alternatively, the pulses can exhibit negative-going amplitude excursions of $-20$ IRE.

The magnitude of each of pulses IA and QA represents a single number estimate of the average side panel I and Q chrominance information, which represents most of the side panel chrominance energy. In this example the average is uniformly weighted for the entire chrominance energy spectrum. However, predetermined non-uniform average weighting also could be used depending upon the requirements of a particular system.

The use of high energy average side panel chrominance information as disclosed is preferred to the use of filtering for extracting high energy low frequency information for separate processing. The averaging process is less complex, less costly and avoids unwanted effects of filtering such as ringing, phase shift and time delay which should be corrected or compensated for. Side panel average chrominance information IA, QA preferably is conveyed during an interval which is normally not intended to be seen by a viewer, such as the vertical blanking interval or the front or back porch segments of the horizontal blanking interval, for example.

FIG. 6a shows apparatus for use with the arrangement of FIG. 6 to improve its noise immunity. Specifically, the signal from network 622 is amplified by a factor of two in a multiplier 650 and amplitude clipped, or limited, by a network 652 to improve the signal to noise ratio of the signal from network 622. Afterwards this signal is applied to demultiplexers 634 and 635, and to subtractor 624 after being amplitude adjusted by a factor of one-half in a multiplier 654 to compensate for the amplification provided by multiplier 650.

FIG. 10 shows details of signal separator 744 in FIG. 7. Signals YN, IN and QN are separated into time expanded center panel signals YE, IE and QE by means of a demultiplexer 1040. These signals are time compressed by a center compression factor (corresponding to the center expansion factor in the encoder of FIG. 1a) by means of a time compressor 1044 to restore the original spatial relationship of the center panel by restored center panel signals YC, IC and QC.

Signal NTSCF is separated into side panel lows component YO and side panel average chrominance pulse components IA and QA via a demultiplexer 1041. Waveforms a, b and c of FIG. 11 illustrate input signal NTSCF and output signals IA and QA of unit 1041. As seen from waveform "a", input signal NTSCF contains left side panel average chrominance pulse components $IA_L$ and $QA_L$ during the back porch interval of one line, and contains right side panel average chrominance pulse components $IA_R$ and $QA_R$ during the back porch interval of the next line. In this illustration pulses $IA_L$, $QA_L$ and $IA_R$, $QA_R$ are depicted as having different amplitudes as shown to indicate that the color values of the side panels differ. The IA output of demultiplexer 1041 contains separated left and right side panel average chrominance pulse components separated by a horizontal line interval (1H) as shown by waveform "b". The QA output of unit 1041 exhibits a similar configuration as indicated by waveform "c".

The output chrominance signals from unit 1041 are sampled and held at specific points in the waveform, producing signals IA and QA respectively. The luminance signal is time expanded by a side panel time expansion factor (corresponding to the side panel compression factor in the encoder of FIG. 1a), and mapped into respective left and right side panel positions to restore the original spatial relationship of the side panel Y components. The amplitude of each demultiplexed pulse from signal NTSCF is measured and a signal representing this amplitude appears at the IA and QA outputs of 1042. The representative signal is held for one horizontal line period. The IA and QA outputs of units 1042 are respectively shown as waveforms d and e in FIG. 11.

Switches 1043 and 1045 are synchronized by a line identifier signal S and are respectively associated with 1H delay elements 1047 and 1048 as shown. The switches toggle once per line. Two horizontal lines complete a switching cycle. With respect to the line sequence shown in FIG. 11, the outputs of the switches respectively convey undelayed signals ($IA_L$ and $QA_L$) for the first half of the line, and 1H delayed signals ($IA_R$ and $QA_R$) for the second half. On the next line, the pulse information of signal NTSCF is $IA_R$ and $QA_R$. Outputs IA and QA of unit 1042 will thus provide $IA_R$ and $QA_R$ information. Switches 1043 and 1045 remain in the 1H delay position for the first half of the line, and switch to the undelayed position for the second half. Thus left and right side panel chrominance components $IA_L$ and $IA_R$, which were transmitted on successive adjacent lines, appear in their proper spatial positions in a given horizontal line. A similar result applies to components $QA_L$ and $QA_R$. Waveform f of FIG. 11 depicts the output of switch 1043.

Spatially restored side panel components YH, ID and QD are combined with spatially restored side panel components, YL, and IA and QA from unit 1042 by a combined 1046 to produce reconstructed side panel signals YS, IS and QS. These signals are spliced to reconstructed enter panel signals YC, IC and QC by means of a splicer 1060 to form a fully reconstructed widescreen luminance signal YF' and fully reconstructed widescreen color difference signals IF' and QF'. Splicing of the side and center panel signal components is accomplished by using an overlapping pixel technique which virtually eliminates a visible seam at the boundary between the center and side panels.

The disclosed system is similar to that shown in U.S. Pat. No. 4,855,811 except as to matters related to the development and processing of side panel average chrominance components IA, QA and ID, QD as discussed herein. U.S. Pat. No. 4,855,811 discloses additional details of many of the system elements such as luminance-chrominance separators, intraframe processors, multidimensional VT and HVT filters, side-center signal separators and combiners, mapping apparatus for performing time expansion and compression, and apparatus for splicing together center and side panel information.

What is claimed is:

1. In a system for processing a television type video signal including first and second sampled data components, apparatus comprising:
   means for providing an auxiliary signal;
   means for providing a difference signal representing the difference between (a) a single numerical value representation of a predetermined weighted average of said first component information and (b) original first component information; and
   means for modulating said auxiliary signal with said difference signal.

2. Apparatus according to claim 1, wherein:
   said first and second components are chrominance and luminance components respectively.

3. Apparatus according to claim 1, wherein:
   said average information is conveyed during an interval containing information normally not intended to be seen by a viewer.

4. Apparatus according to claim 3, wherein said interval is a horizontal blanking interval.

5. Apparatus according to claim 4, wherein said average information is conveyed during the back porch portion of a horizontal blanking interval.

6. Apparatus according to claim 2, wherein said auxiliary signal exhibits a field alternating phase unlike that of a standard chrominance subcarrier.

7. In a system for receiving a television-type video signal including first and second sampled data components, and an auxiliary signal modulated by a difference signal representative of the difference between (a) a single numerical value representation of a predetermined weighted average of first component information and (b) original first component information; apparatus comprising:
   signal processing means including means for demodulating said auxiliary signal to produce a demodulated signal including said difference signal;
   means for processing said difference signal to provide original first component information; and
   means for combining said original first component information and second component information.

8. Apparatus according to claim 7, wherein
   said first and second components are chrominance and luminance components respectively; and
   said system further includes means for providing a reference signal to said demodulating means having a field reversing phase unlike that of a standard chrominance subcarrier.

9. A system according to claim 7, wherein said processing means includes
   means for deriving average first component information from a portion of said television signal containing information normally not intended to be seen by a viewer.

10. In a system for processing a widescreen television type video signal containing main panel information and side panel information including luminance and chrominance components, apparatus comprising:
    means for processing said main panel information;
    means for providing an auxiliary signal; and
    means for processing said side panel information, including means for modulating said auxiliary signal with a difference signal representing the difference between (a) a single numerical value representation of a predetermined weighted average of side panel chrominance information and (b) original side panel chrominance information.

11. In a system for processing a widescreen television type video signal containing main panel information and side panel information including luminance and chrominance components, apparatus comprising:
    means for processing said main panel information;
    means for providing an auxiliary signal; and
    means for processing said side panel information, including means for modulating said auxiliary signal with a difference signal representing the difference between a predetermined weighted average of side panel chrominance information and original side panel chrominance information; wherein said average side panel information is uniformly weighted.

12. Apparatus according to claim 10, wherein:
    said average side panel chrominance information is conveyed during an interval containing information normally not intended to be seen by a viewer.

13. In a system for processing a widescreen television type video signal containing main panel information and side panel information including luminance and chrominance components, apparatus comprising:
    means for processing said main panel information;
    means for providing an auxiliary signal; and
    means for processing said side panel information, including means for modulating said auxiliary signal with a difference signal representing the difference between a predetermined weighted average of side panel chrominance information and original side panel chrominance information; wherein
    said average side panel chrominance information is conveyed during a horizontal blanking interval.

14. Apparatus according to claim 13, wherein said average side panel chrominance information is conveyed during the back porch portion of a horizontal blanking interval.

15. In a system for processing a widescreen television type video signal containing main panel information and side panel information including luminance and chrominance components, apparatus comprising:
means for processing said main panel information;
means for providing an auxiliary signal; and
means for processing said side panel information, including means for modulating said auxiliary signal with a difference signal representing the difference between a predetermined weighted average of side panel chrominance information and original side panel chrominance information; wherein
said average side panel chrominance information is conveyed during an interval containing information normally not intended to be seen by a viewer; and wherein
average left side panel chrominance information and average right side panel chrominance information is conveyed during alternate image lines, respectively.

16. Apparatus according to claim 10, wherein
said auxiliary signal exhibits a field alternating phase unlike that of a standard chrominance subcarrier.

17. In a system for processing a widescreen television type video signal containing main panel information and side panel information including luminance and chrominance components, apparatus comprising:
means for processing said main panel information;
means for providing an auxiliary signal; and
means for processing said side panel information, including means for modulating said auxiliary signal with a difference signal representing the difference between a predetermined weighted average of side panel chrominance information and original side panel chrominance information; wherein
said auxiliary signal is additionally modulated with high frequency side panel luminance information;
said average side panel chrominance information is conveyed during a first interval containing information normally not intended to be seen by a viewer; and
low frequency side panel luminance information is conveyed during a second interval containing information normally not intended to be seen by a viewer.

18. Apparatus according to claim 17, wherein
said second interval is a horizontal overscan interval.

19. In a system for processing a widescreen television type video signal containing main panel information and side panel information including luminance and chrominance components, apparatus comprising:
means for processing said main panel information;
means for providing an auxiliary signal; and
means for processing said side panel information, including means for modulating said auxiliary signal with a difference signal representing the difference between a predetermined weighted average of side panel chrominance information and original side panel chrominance information; wherein
said chrominance component includes first and second types of chrominance information associated with each of left and right side panels;
said system includes means for providing (a) a first signal representative of average chrominance information of said first type for said left side panel, (b) a second signal representative of average chrominance information of said second type for said left side panel, (c) a third signal representative of average chrominance information of said first type for said right side panel, and (d) a fourth signal representative of average chrominance information of said second type for said right side panel;
two of said first, second, third and fourth signals are conveyed during one horizontal image line; and
two of said first, second, third and fourth signals are conveyed during another horizontal image line.

20. Apparatus according to claim 19, wherein
said first and second signals are conveyed during the blanking interval of a first horizontal image line; and
said second and third signals are conveyed during the blanking interval of a second horizontal image line.

21. Apparatus according to claim 20, wherein
said first, second, third and fourth signals are pulses; and
said first and second horizontal image lines are adjacent.

22. In a system for receiving a widescreen television-type video signal containing main panel information and side panel information including luminance and chrominance components, and an auxiliary signal modulated by a difference signal representative of the difference between (a) a single numerical value representation of a predetermined weighted average of side panel chrominance information and (b) original side panel chrominance information; apparatus comprising:
means for separating said main panel information and said modulated auxiliary signal;
side panel signal processing means including means for demodulating said auxiliary signal to produce a demodulated signal including said difference signal;
means responsive to said video signal for providing said average side panel chrominance information;
means for combining said average side panel chrominance information and said difference signal to provide said original side panel chrominance information; and
means for combining said original side panel chrominance information and said separated main panel information.

23. A system according to claim 22, wherein
said demodulated signal additionally includes high frequency side panel luminance information.

24. A system according to claim 22, wherein
said side panel signal processing means includes means for time expanding low frequency side panel information exclusive of high frequency side panel information;
said demodulated signal additionally includes high frequency side panel luminance information; and
said combining means combines said time expanded low frequency side panel luminance information, said high frequency side panel luminance information and said original side panel chrominance information.

25. A system according to claim 22 and further including
means for providing a reference signal to said demodulating means, said reference signal having a field reversing phase unlike that of a standard chrominance subcarrier.

26. A system according to claim 22, wherein said processing means includes means for deriving average side panel chrominance information from a portion of said television signal containing information normally not intended to be seen by a viewer.

27. In a system for receiving a widescreen television-type video signal containing main panel information and side panel information including luminance and chrominance components, and an auxiliary signal modulated by a difference signal representative of the difference between a predetermined weighted average of side panel chrominance information and original side panel chrominance information; apparatus comprising:

means for separating said main panel information and said modulated auxiliary signal;

side panel signal processing means including means for demodulating said auxiliary signal to produce a demodulated signal including said difference signal;

means for processing said difference signal to provide said original side panel chrominance information;

means for combining said original side panel chrominance information and said separated main panel information; and means included in said processing means for deriving average side panel chrominance information from a portion of said television signal containing information normally not intended to be seen by a viewer, said portion of said television signal being a horizontal blanking interval.

28. In a system for receiving a widescreen television-type video signal containing main panel information and side panel information including luminance and chrominance components, and an auxiliary signal modulated by a difference signal representative of the difference between a predetermined weighted average of side panel chrominance information and original side panel chrominance information; apparatus comprising:

means for separating said main panel information and said modulated auxiliary signal;

side panel signal processing means including means for demodulating said auxiliary signal to produce a demodulated signal including said difference signal;

means for processing said difference signal to provide said original side panel chrominance information; and means for combining said original side panel chrominance information and said separated main panel information; and means included in said processing means for deriving average side panel chrominance information from a portion of said television signal containing information normally not intended to be seen by a viewer; wherein said deriving means derives average left side panel chrominance information and average right side panel chrominance information from blanking intervals of adjacent horizontal image lines, respectively.

29. In a system for receiving a widescreen television-type video signal containing main panel information and side panel information including luminance and chrominance components, and an auxiliary signal modulated by a difference signal representative of the difference between a predetermined weighted average of side panel chrominance information and original side panel chrominance information; apparatus comprising:

means for separating said main panel information and said modulated auxiliary signal;

side panel signal processing means including means for demodulating said auxiliary signal to produce a demodulated signal including said difference signal;

means for processing said difference signal to provide said original side panel chrominance information;

means for combining said original side panel chrominance information and said separated main panel information; and means included in said processing means for deriving average side panel chrominance information from a portion of said television signal containing information normally not intended to be seen by a viewer; wherein derived left side panel average chrominance information includes first and second signal components derived from a portion of a first image line and representative of first and second types of chrominance information respectively; and derived right side panel average chrominance information includes third and fourth signal components derived from a portion of a second image line and representative of first and second types of chrominance information respectively.

* * * * *